(12) United States Patent
Li et al.

(10) Patent No.: US 12,703,110 B2
(45) Date of Patent: Aug. 11, 2026

(54) TRANSFER DEVICE FOR ZIRCONIA MATERIAL FOR PRODUCTION

(71) Applicant: SHENZHEN YURUCHENG DENTAL MATERIALS CO., LTD., Shenzhen (CN)

(72) Inventors: Zongyu Li, Shenzhen (CN); Wei Liu, Shenzhen (CN); Jianjun Liu, Shenzhen (CN); Yu Zhang, Shenzhen (CN); Jizong Hu, Shenzhen (CN)

(73) Assignee: SHENZHEN YURUCHENG DENTAL MATERIALS CO., LTD., Shenzhen (CN)

( * ) Notice: Subject to any disclaimer, the term of this patent is extended or adjusted under 35 U.S.C. 154(b) by 0 days.

(21) Appl. No.: 18/978,340

(22) Filed: Dec. 12, 2024

(65) Prior Publication Data

US 2025/0196370 A1 Jun. 19, 2025

(30) Foreign Application Priority Data

Dec. 13, 2023 (CN) ......................... 202311703808.1

(51) Int. Cl.

| | |
|---|---|
| ***B25J 9/02*** | (2006.01) |
| ***B25J 15/00*** | (2006.01) |
| ***B25J 15/06*** | (2006.01) |

(52) U.S. Cl.

CPC ........... *B25J 15/0616* (2013.01); *B25J 9/026* (2013.01); *B25J 15/0028* (2013.01)

(58) Field of Classification Search

CPC .... B25J 15/0616; B25J 9/026; B25J 15/0028; B25J 13/085; B25J 15/0004;

(Continued)

(56) References Cited

U.S. PATENT DOCUMENTS 11,173,596 B2 * 11/2021 Maruno ............... B25J 17/0266
2014/0340672 A1 * 11/2014 Yam ..................... G02C 13/003
356/124

(Continued)

FOREIGN PATENT DOCUMENTS

CN 105522573 A 4/2016
CN 205870516 U 1/2017

(Continued)

OTHER PUBLICATIONS

Monkman et al., "Robotic Gripper; Chapter 2: Automatic Prehension"; 2007; Wiley-VCH;pp. 47-48. (Year: 2007).*

(Continued)

*Primary Examiner* — Lynn E Schwenning
(74) *Attorney, Agent, or Firm* — Westbridge IP LLC

(57) ABSTRACT

A transfer device for Zirconia material for production includes an X-direction truss, a Y-direction truss and a Z-direction truss supported by a support frame. The claw assembly is adjusted to the Zirconia disc through the truss, and the centering clip is configured to lift the Zirconia disc upward and act on four points around it to complete the centering. At this time, after the negative pressure adsorption of the processing suction cup, the centering clip is separated from the Zirconia disc. After the Zirconia disc is pushed out of the claw assembly by the clamping cylinder, the disk surface of the Zirconia disc is turned to one side by the rotating motor.

6 Claims, 5 Drawing Sheets

(58) Field of Classification Search
CPC .. B25J 15/0042; B25J 15/0061; B25J 15/026; B25J 17/0258; B25J 17/0225; B25J 17/00; B25J 19/02; B65G 47/914
See application file for complete search history.

(56) References Cited

U.S. PATENT DOCUMENTS

| | | | | |
|---|---|---|---|---|
| 2017/0165456 | A1* | 6/2017 | Tutungi | A61M 25/09041 |
| 2017/0181341 | A1 | 6/2017 | Yamamoto | |
| 2018/0065189 | A1* | 3/2018 | Gerst | B26F 1/3846 |
| 2018/0340819 | A1* | 11/2018 | Taira | B25J 19/02 |

FOREIGN PATENT DOCUMENTS

| | | | | |
|---|---|---|---|---|
| CN | 212947854 U | | 4/2021 | |
| CN | 216464683 U | | 5/2022 | |
| CN | 219057783 U | | 5/2023 | |
| JP | 2000-61975 | * | 2/2000 | B25J 15/06 |
| JP | 2000061875 A | | 2/2000 | |
| JP | 2002264908 A | | 9/2002 | |

OTHER PUBLICATIONS

Notification to Grant Patent Right for Invention issued in counterpart Chinese Patent Application No. 202311703808.1, dated Jan. 19, 2024.

Extended European Search Report issued in counterpart European Patent Application No. 24219441.3, dated Apr. 11, 2025.

* cited by examiner

TRANSFER DEVICE FOR ZIRCONIA MATERIAL FOR PRODUCTION

CROSS-REFERENCE TO RELATED APPLICATIONS

The present application claims priority to Chinese Patent Application No. 202311703808.1, filed on Dec. 13, 2023, the entire contents of which are incorporated herein by reference.

TECHNICAL FIELD

The present application relates to the technical field of Zirconia processing fixtures, and in particular to a transfer device for Zirconia material for production.

BACKGROUND

Zirconia is an important ceramic material, which has a high melting point, high hardness, high corrosion resistance, low thermal conductivity and excellent mechanical properties, thus it is widely used in many fields. Zirconia was first discovered and used in the chemical industry and ceramics field. With the development of technology, Zirconia is not only widely used in traditional ceramic fields, such as pottery, refractory materials and abrasives, but also in the dental field. The high corrosion resistance and biocompatibility of Zirconia make it an ideal material for making dental dentures and implants. Zirconia dentures have excellent aesthetics, wear resistance and oxidation resistance, and are gradually becoming the mainstream choice to replace traditional metal bases.

Since Zirconia is highly brittle and prone to cracking during processing, it is necessary to transfer and set steps through a clamp or a suction cup before processing (i.e., cutting out a circular ring with a thickness of 10 mm and a width of 2 mm on the edge of the Zirconia disc), which can reduce the stress concentration on Zirconia during the cutting process. However, when the Zirconia disc is fixed by the traditional clamp or the suction cup, the clamping or adsorption eccentricity may cause uneven force or stress. The deviation of the step value may also affect the subsequent processing of the Zirconia disc and cause cracking. In addition, the traditional clamp needs to be re-clamped after processing one side of the Zirconia disc, so as to process the other side of the Zirconia disc. Not only are the steps cumbersome, but the risk of damage to Zirconia is further increased.

Therefore, a transfer device for Zirconia material for production is urgently needed to solve the above problems.

SUMMARY

The purpose of the present application is to provide a transfer device for Zirconia material for production, aiming to solve the problem that the transfer fixation of Zirconia disc in the related art is prone to eccentricity.

The present application provides a transfer device for Zirconia material for production, including an X-direction truss, a Y-direction truss and a Z-direction truss supported by a support frame, and a rotating head rotatably installed through a guide end of the Z-direction truss, configured to drive the rotating head to transfer along the X, Y and Z directions of the truss. The rotating head has a semicircular shape, a claw assembly is rotatably installed along an arc-shaped portion of the rotating head, two clamping plates are installed at a bottom of the claw assembly, flipping plates are movably installed on the two clamping plates, and two centering clips installed on the flipping plate are configured to clamp a Zirconia disc in center and perform a flipping operation; and a clamping cylinder is further installed inside the claw assembly, a retractable end of the clamping cylinder is configured to extend in between inner sides of the two clamping plates, a weighing sensor is provided at the retractable end of the clamping cylinder to weigh the Zirconia disc and a processing suction cup is provided at the retractable end of the clamping cylinder to adsorb and fix the Zirconia disc clamped by the claw assembly after a suction force is generated on the processing suction cup by a negative pressure pump.

A steering motor is installed in a middle of the rotating head, an output shaft of the steering motor is connected to a guide frame for fixing the claw assembly, the arc-shaped portion of the rotating head is provided with a guide groove, and the guide frame is configured to slide in the guide groove; and the guide end of the Z-direction truss is installed with a rotating motor, and a top of the rotating head is connected to an output shaft of the rotating motor.

In an embodiment, the claw assembly is in an inverted, square "U" shape, inner walls on both sides of the claw assembly are connected to clamping rods through bearings, shaft ends of the two clamping rods are connected in a synchronous transmission through a belt, and a clamping motor configured for driving one of the clamping rods to rotate is installed on one side of a top of the claw assembly.

In an embodiment, forward threads and reverse threads are respectively provided on surfaces of both ends of the two clamping rods, and two ends of the two clamping rods are connected to connecting blocks through forward threads and reverse threads respectively; and a connecting plate is installed at a bottom of the connecting block, a second spring is clamped inside the connecting plate, a support rod inclined to an outside of the claw assembly is slidably installed on the connecting plate at a lower end of the second spring, and the clamping plate is connected through the support rod.

In an embodiment, the two clamping plates are respectively provided at ends of the two clamping rods, the flipping plate is centrally connected to the clamping plate through a rotating shaft, and a flipping motor installed on an outside of one of the clamping plates is configured to drive the flipping plate to rotate.

In an embodiment, the centering clip is made of hard silicone, and an end of the centering clip is provided with an inclined surface.

In an embodiment, a negative pressure pump is installed at the guide end of the Z-direction truss, and an air pipe is connected between a suction end of the negative pressure pump and the processing suction cup.

The present application discloses a transfer device for Zirconia material for production, and the beneficial effects are as follows.

Firstly, the X-direction truss, the Y-direction truss and the Z-direction truss are provided to drive the rotating head to transfer along the X, Y and Z axis directions of the truss, so that the claw assembly can complete the transfer operation of the Zirconia disc between the conveying mechanism and the computer numerical control (CNC) lathe, and the claw assembly can rotate along the arc-shaped portion at the bottom of the rotating head to achieve the adjustment requirements for the orientation of the Zirconia disc surface, so as to perform the transfer and processing operations.

Secondly, the clamping cylinder is installed in the claw assembly, and a negative pressure pump is configured to generate suction force on the processing suction cup, which is configured to adsorb and fix the Zirconia disc clamped in the center by the claw assembly, so as to ensure that the stress can be concentrated when setting the step, and it is not easy for the step value to deviate or the Zirconia disc to break.

Thirdly, the centering clip is provided in a C shape, so that there are 4 supporting points acting on the Zirconia disc, and the force is simultaneously applied to the middle, which will open the centering clip. The reaction force generated by the centering clip squeezing the first spring will clamp the Zirconia disc to the center.

Lastly, during the transfer process, the claw assembly is adjusted to the Zirconia disc through the truss, and the two clamping plates are driven to move closer through the clamping motor. The centering clip is configured to lift the Zirconia disc upward and act on four points around it to complete the centering. At this time, after the negative pressure adsorption of the processing suction cup, the centering clip is separated from the Zirconia disc. After the Zirconia disc is pushed out of the claw assembly by the clamping cylinder, the disk surface of the Zirconia disc is turned to one side by the rotating motor for processing. When it needs to flip the Zirconia disc, the Zirconia disc is retracted into the claw assembly through the clamping cylinder, the Zirconia disc is clamped again by the centering clip, the processing suction cup is separated from the Zirconia disc, and the flipping plate is driven by the flipping motor to rotate 180°, which simplifies the clamping steps and reduces the damage to the Zirconia disc.

DETAILED DESCRIPTION OF THE EMBODIMENTS

In order to make the purpose, technical scheme and advantages of the present application more clear, the present application is further explained in detail combined with the accompanying drawings and embodiments. It should be understood that the specific embodiments described herein are only intended to interpret the present application and are not intended to qualify it.

Identical or similar references in the accompanying drawings correspond to identical or similar parts. In the description of the present application, it should be understood that where the terms "up", "down", "left", "right", etc., indicate a bearing or position relationship based on the bearing or position relationship shown in the accompanying drawings, it is only for the purpose of facilitating the description of the present application and simplifying the description, and not to indicate or imply that the device or element referred to must have a particular bearing, be constructed and operated in a particular bearing. Therefore, the terms used to describe the location relationship in the accompanying drawings are for illustrative purposes only and cannot be construed as a limitation of the patent. For those skilled in the art, the specific meaning of the above terms can be understood according to the specific circumstances.

The following is a detailed description of the implementation of the present application with reference to specific embodiments.

Figure 1:
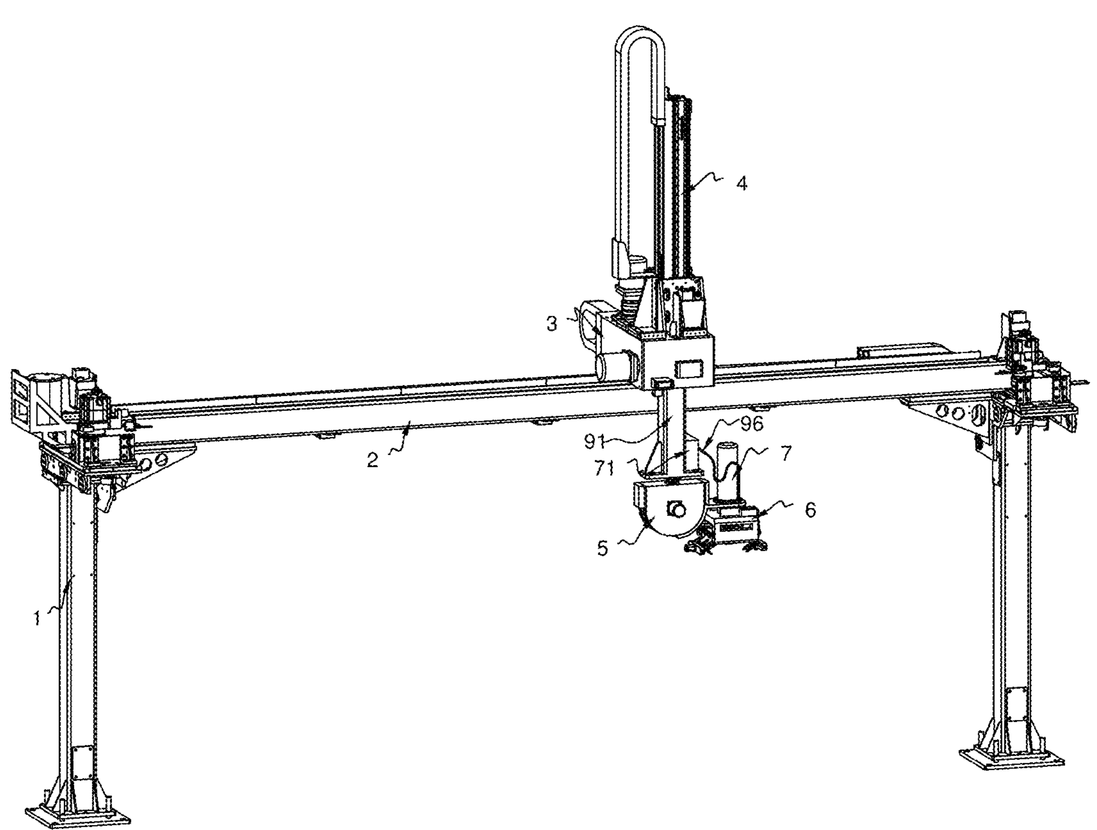
FIG. 1 is a schematic view of a transfer device for Zirconia material for production according to an embodiment of the present application.
Figure 2:
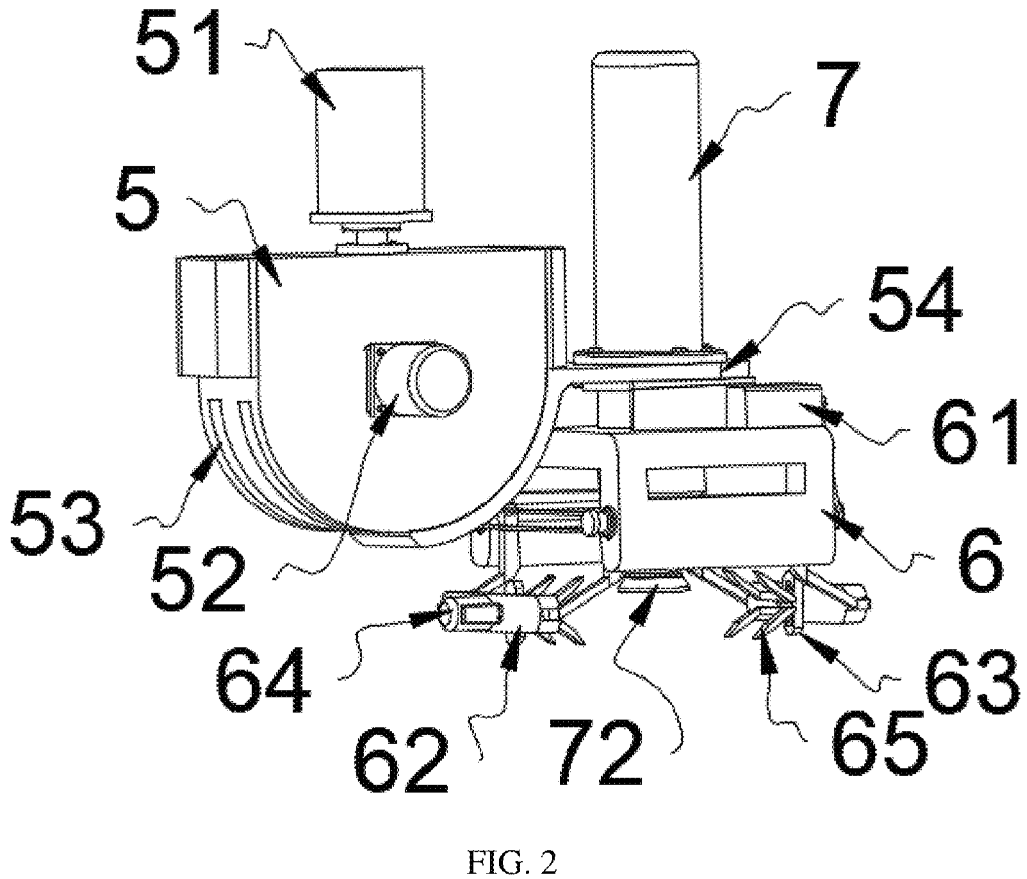
FIG. 2 is a schematic structural view of a rotating head and a claw assembly of the transfer device for Zirconia material for production according to an embodiment of the present application.
Figure 3:
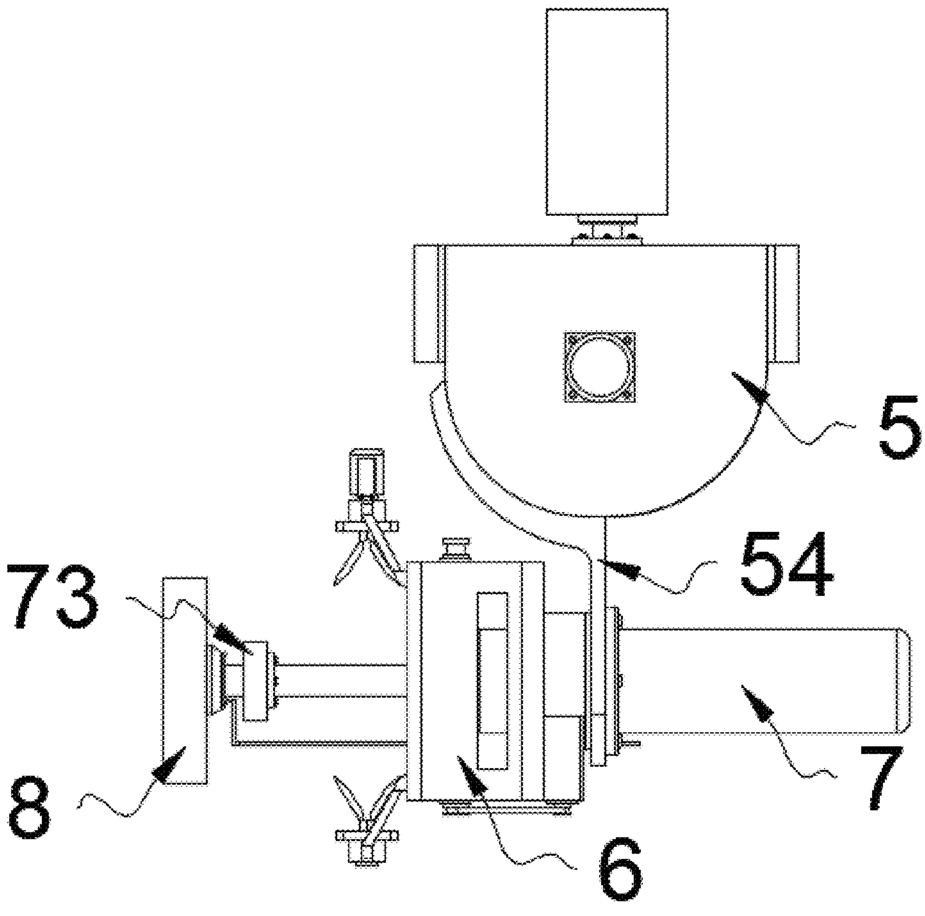
FIG. 3 is a schematic structural view of the transfer device for Zirconia material for production in a gripping processing state according to an embodiment of the present application.

In this embodiment, referring to FIG. 1 to FIG. 3, the transfer device for Zirconia material for production comprises an X-direction truss 2, a Y-direction truss 3 and a Z-direction truss 4 supported by a support frame 1, and a rotating head 5 rotatably installed at the guide end 91 through the Z-direction truss 4. The transfer device is configured to drive the rotating head 5 to transfer along the X, Y and Z axis directions of the truss. The rotating head 5 is in a semicircle, and a claw assembly 6 is rotatably installed along an arc-shaped portion of the rotating head 5. Two clamping plates 62 are installed at the bottom of the claw assembly 6, and flipping plates 63 are movably installed on the two clamping plates 62. A centering clip 65 is installed on the flipping plate 63, and the two centering clips 65 are configured to clamp the Zirconia disc 8 in the center and perform a flipping operation.

A clamping cylinder 7 is also installed inside the claw assembly 6, and the retractable end of the clamping cylinder 7 is configured to extend into the clamping plate 62, and are respectively provided with a weighing sensor 73 and a processing suction cup 72, which are configured to weigh the Zirconia disc 8 and perform adsorption and fixing operations. In the present application, the weighing sensor 73 is only used for weighing. The specific structure can be referred to the related art.

A steering motor 52 is installed in the middle of the rotating head 5, and the output shaft of the steering motor 52 is connected with a guide frame 54 for fixing the claw assembly 6. The arc-shaped portion of the rotating head 5 is provided with a guide groove 53, and the guide frame 54 can slide inside the guide groove 53.

Further, a rotating motor 51 is installed on the guide end 91 portion of the Z-direction truss 4, and the top of the rotating head 5 is connected with the output shaft of the rotating motor 51, which is configured to drive the claw assembly 6 on the rotating head 5 to move in a circumferential direction along the end of the Z-direction truss 4, so that the position of the claw assembly 6 can be adjusted more flexibly, so as to quickly grab and transfer the Zirconia material on the two conveyor belts.

Figure 4:
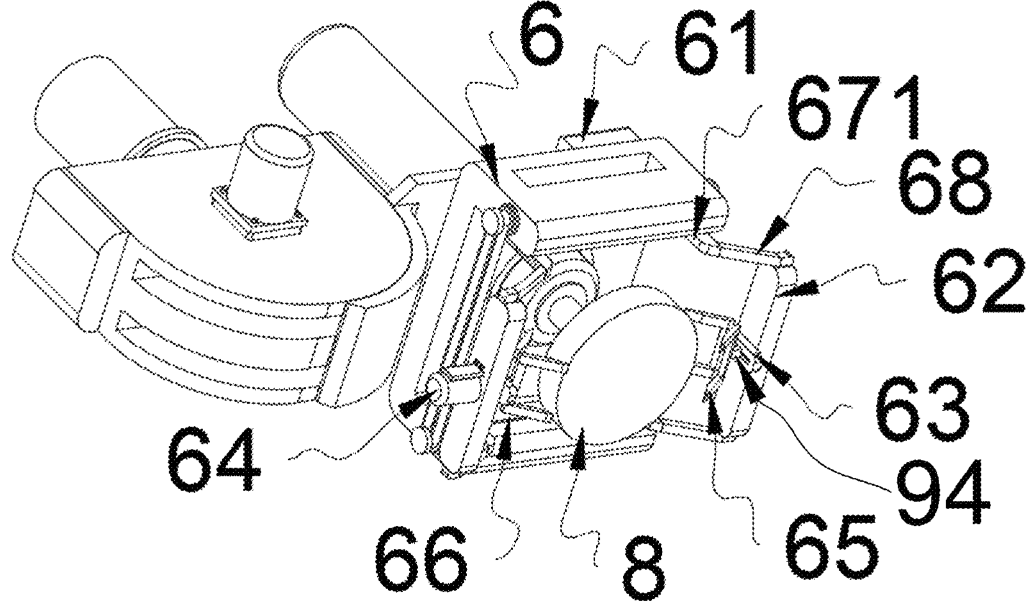
FIG. 4 is a schematic upward structural view of the transfer device for Zirconia material for production according to an embodiment of the present application.
Figure 5:
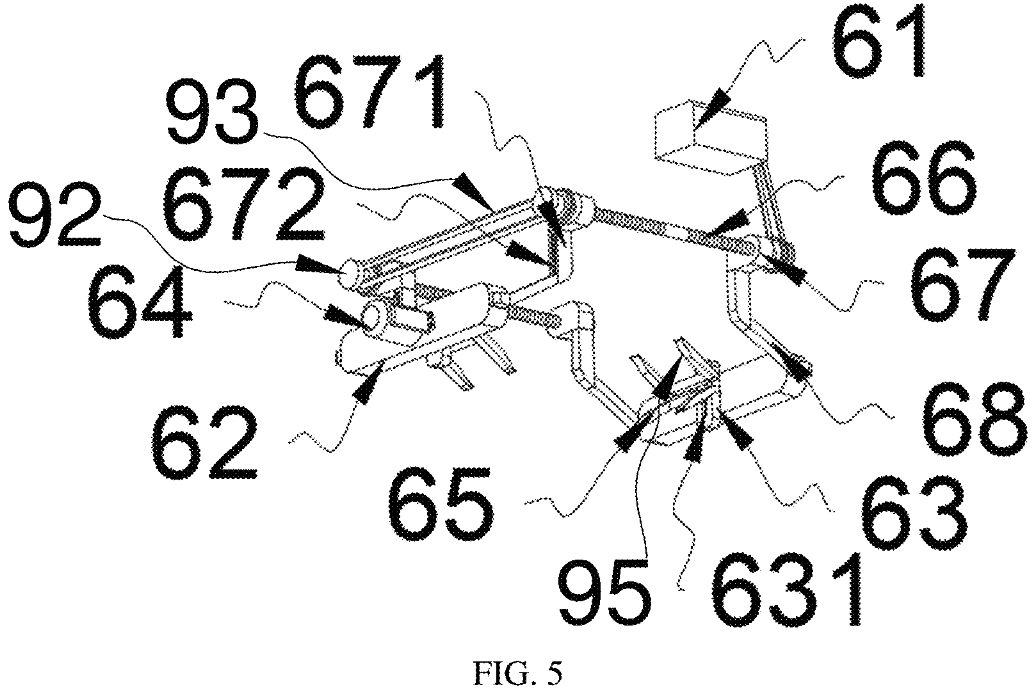
FIG. 5 is a schematic partial structural view of the transfer device for Zirconia material for production according to an embodiment of the present application.

It should be noted that, as shown in FIG. 3 to FIG. 5, the claw assembly 6 is arranged in an "n" shape, inner walls on both sides of the claw assembly 6 are connected to clamping rods 66 through bearings 92, and the shaft ends of the two clamping rods 66 are in a synchronous transmission connection through the belt 93. A clamping motor 61 for driving one of the clamping rods 66 to rotate is installed on one side of the top of the claw assembly 6, forward threads and reverse threads are respectively provided on the two end surfaces of the two clamping rods 66, and connecting blocks 67 are respectively connected to the two ends through the forward threads and reverse threads. A connecting plate 671 is installed at the bottom of the connecting block 67, a second spring 672 is clamped inside the connecting plate 671, and a support rod 68 inclined to the outside of the claw assembly 6 is slidably installed on the connecting plate 671 at the lower end of the second spring 672. The clamping plate 62 is connected through the support rod 68, and the two clamping rods 66 are driven by the clamping motor 61 to realize synchronous rotation, thereby pushing the connecting block 67 connected with the forward threads and the reverse threads to adjust the distance between the two clamping plates 62, thus the Zirconia disc 8 is clamped in the center.

Further, when the centering clip 65 touches the bottom, the clamping plate 62 can squeeze the second spring 672 in the direction of the support rod 68, thereby generating a certain buffer, so that the centering clip 65 can completely touch the bottom. When the centering clip 65 moves towards the Zirconia disc 8 to clamp, the Zirconia disc 8 can be lifted up and clamped.

The two clamping plates 62 are respectively provided at the ends of the two clamping rods 66, the flipping plate 63 is centrally connected to the clamping plate 62 through a rotating shaft 94, a flipping motor 64 is installed on the outer side of one of the clamping plates 62, and the flipping motor 64 is configured to drive the flipping plate 63 to rotate, thereby realizing the flipping of the Zirconia disc 8 clamped by the centering clip 65 on the flipping plate 63.

In order to keep the Zirconia disc 8 centered during the clamping process, the inner sides of the upper and lower parts of the two flipping plates 63 are clamped with first springs 631, and the two centering clips 65 are respectively connected to the ends of the two first springs 631 facing each other. The centering clips 65 are in C-shaped, and the two centering clips 65 are inclined at an angle of 30°. The guide end 91 of the Z-direction truss 4 is installed with a negative pressure pump 71, and an air pipe 96 is connected between the suction end of the negative pressure pump 71 and the processing suction cup 72. Since the centering clip 65 is in C-shaped, there are 4 supporting points acting on the four sides of the Zirconia disc 8, and the force is clamped in the middle synchronously, so that the centering clip 65 is stretched open. The reaction force generated by the centering clip 65 squeezing the first spring 631 will clamp the Zirconia disc 8. At this time, the clamping cylinder 7 pushes the processing suction cup 72 out and acts on the surface of the Zirconia disc 8. The negative pressure pump 71 generates negative pressure suction to adsorb and fix the Zirconia disc 8. The adsorption position is centered to ensure that the stress is concentrated when setting the step, and it is not prone to the step value deviation or rupture.

The material of the centering clip 65 is hard silicone, and the end of the centering clip 65 is provided with an inclined surface 95. The centering clip 65 is soft in texture and has a certain support, which can ensure that the Zirconia disc 8 is lifted up and reduce the possibility of damage to the edge during the clamping process.

The X-direction truss 2, the Y-direction truss 3 and the Z-direction truss 4 are provided to drive the rotating head 5 to transfer along the X-axis, Y-axis and Z-axis of the truss, so that the claw assembly 6 can complete the transfer operation of the Zirconia disc 8 between the conveying mechanism and the computer numerical control (CNC) lathe, and the claw assembly 6 can rotate along the arc-shaped portion at the bottom of the rotating head 5 to achieve the adjustment requirement of the disk surface direction of the Zirconia disc 8, so as to perform the transfer and processing operations.

The clamping cylinder 7 is installed in the claw assembly 6, and the negative pressure pump 71 is configured to generate suction force on the processing suction cup 72, which is configured to adsorb and fix the Zirconia disc 8 clamped in the center by the claw assembly 6, so as to ensure that the stress is concentrated when setting the step, and it is not easy to for the step value to deviate or the Zirconia disc 8 to break.

The centering clip 65 is in the C-shaped, so that there are four supporting points acting on the four sides of the Zirconia disc 8, and the force is clamped in the middle synchronously, thus the centering clip 65 is stretched open, and the reaction force generated by the centering clip 65 squeezing the first spring 631 will clamp the Zirconia disc 8 to the center.

During the transfer process, the claw assembly 6 is adjusted to the Zirconia disc 8 through the truss, the two clamping plates 62 are driven to move closer through the clamping motor 61, and the centering clip 65 lifts the Zirconia disc 8 upward and acts on four points to complete the centering. At this time, after the negative pressure adsorption by the processing suction cup 72, the centering clip 65 is separated from the Zirconia disc 8. The Zirconia disc 8 is pushed out of the claw assembly 6 by the clamping cylinder 7, and the disk surface of the Zirconia disc 8 is turned to one side by the rotating motor 51 for processing operation. When it needs to flip the Zirconia disc 8, the Zirconia disc 8 is retracted into the claw assembly 6 by the clamping cylinder 7, the Zirconia disc 8 is clamped again by the centering clip 65, the processing suction cup 72 is separated from the Zirconia disc 8, and the flipping plate 63 is driven by the flipping motor 64 to rotate 180°, thereby simplifying the clamping steps and reducing the possibility of damage to the Zirconia disc 8.

The above are only embodiments of the present application and are not intended to limit the present application. Any modification, equivalent substitution, improvement, etc. made within the spirit and principles of the present application shall be covered in the scope of the present application.

What is claimed is:

1. A transfer device for Zirconia material for production, comprising an X-direction truss, a Y-direction truss and a Z-direction truss supported by a support frame, and a rotating head rotatably installed through a guide end of the Z-direction truss, configured to drive the rotating head to transfer along the X, Y and Z directions of the truss, wherein:

the rotating head has a semicircular shape, a claw assembly is rotatably installed along an arc-shaped portion of the rotating head, two clamping plates are installed at a bottom of the claw assembly, flipping plates are movably installed on the two clamping plates, and two centering clips installed on the flipping plate are configured to clamp a Zirconia disc at a center and perform a flipping operation; and a clamping cylinder is further installed inside the claw assembly, a retractable end of the clamping cylinder is configured to extend in between inner sides of the two clamping plates, a weighing sensor is provided at the retractable end of the clamping cylinder to weigh the Zirconia disc and a processing suction cup is provided at the retractable end of the clamping cylinder to adsorb and fix the Zirconia disc clamped by the claw assembly after a suction force is generated on the processing suction cup by a negative pressure pump;

wherein a steering motor is installed in a middle of the rotating head, an output shaft of the steering motor is connected to a guide frame for fixing the claw assembly, the arc-shaped portion of the rotating head is provided with a guide groove, and the guide frame is configured to slide in the guide groove; and the guide end of the Z-direction truss is installed with a rotating motor, and a top of the rotating head is connected to an output shaft of the rotating motor.

2. The transfer device for Zirconia material for production of claim 1, wherein the claw assembly is in an inverted, square "U" shape, inner walls on both sides of the claw assembly are connected to clamping rods through bearings, shaft ends of the two clamping rods are connected in a synchronous transmission through a belt, and a clamping motor configured for driving one of the clamping rods to rotate is installed on one side of a top of the claw assembly.

3. The transfer device for Zirconia material for production of claim 2, wherein forward threads and reverse threads are respectively provided on surfaces of both ends of the two clamping rods, and two ends of the two clamping rods are connected to connecting blocks through forward threads and reverse threads respectively; and a connecting plate is installed at a bottom of the connecting block, a second spring is clamped inside the connecting plate, a support rod inclined to an outside of the claw assembly is slidably installed on the connecting plate at a lower end of the second spring, and the clamping plate is connected to the claw assembly through the support rod.

4. The transfer device for Zirconia material for production of claim 2, wherein the two clamping plates are respectively provided at ends of the two clamping rods, the flipping plate is centrally connected to the clamping plate through a rotating shaft, and a flipping motor installed on an outside of one of the clamping plates is configured to drive the flipping plate to rotate.

5. The transfer device for Zirconia material for production of claim 1, wherein the centering clip is made of hard silicone, and an end of the centering clip is provided with an inclined surface.

6. The transfer device for Zirconia material for production of claim 1, wherein the negative pressure pump is installed at the guide end of the Z-direction truss, and an air pipe is connected between a suction end of the negative pressure pump and the processing suction cup.

* * * * *